(12) United States Patent
Chisaka

(10) Patent No.: US 11,395,386 B2
(45) Date of Patent: Jul. 19, 2022

(54) SEMICONDUCTOR DEVICE

(71) Applicants: Kabushiki Kaisha Toshiba, Tokyo (JP); Toshiba Electronic Devices & Storage Corporation, Tokyo (JP)

(72) Inventor: Junichi Chisaka, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 146 days.

(21) Appl. No.: 16/999,287

(22) Filed: Aug. 21, 2020

(65) Prior Publication Data

US 2021/0243860 A1  Aug. 5, 2021

(30) Foreign Application Priority Data

Jan. 30, 2020 (JP) .............................. JP2020-013363

(51) Int. Cl.
| | |
|---|---|
| *H05B 45/18* | (2020.01) |
| *G05F 3/26* | (2006.01) |
| *H05B 45/397* | (2020.01) |
| *G05F 3/24* | (2006.01) |

(52) U.S. Cl.
CPC ............. *H05B 45/18* (2020.01); *G05F 3/245* (2013.01); *G05F 3/265* (2013.01); *H05B 45/397* (2020.01)

(58) Field of Classification Search
CPC ....... H05B 45/18; H05B 45/397; G05F 3/245; G05F 3/265
See application file for complete search history.

(56) References Cited

U.S. PATENT DOCUMENTS

| | | | | |
|---|---|---|---|---|
| 8,946,995 | B2 * | 2/2015 | Pflaum | H05B 45/18 315/120 |
| 2010/0156190 | A1 | 6/2010 | Mizuno | |
| 2010/0244790 | A1 * | 9/2010 | La Rosa | G05F 1/46 323/272 |
| 2013/0169152 | A1 * | 7/2013 | Ishii | H05B 47/10 315/77 |
| 2016/0119993 | A1 * | 4/2016 | Lee | H05B 45/397 315/307 |
| 2017/0347419 | A1 * | 11/2017 | Cusey | G01J 1/32 |

FOREIGN PATENT DOCUMENTS

| | | |
|---|---|---|
| JP | H03-200381 A | 9/1991 |
| JP | 2010-152566 A | 7/2010 |
| JP | 2012-243885 A | 12/2012 |

\* cited by examiner

*Primary Examiner* — Jue Zhang
(74) *Attorney, Agent, or Firm* — Allen & Overy LLP

(57) ABSTRACT

According to one embodiment, a semiconductor device includes a first current mirror having an output end coupled to a first node, a second current mirror having an output end coupled to a second node, a third current mirror having an input end coupled to the second node and an output end coupled to the first node, a fourth current mirror having an input end coupled to the first node, and an output driver that generate a current based on the fourth current mirror. A current flows to the first current source changes at a first ratio with respect to temperature, a current flows to the second current source changes at a second ratio having a negative correlation with respect to temperature, and an absolute value of the first ratio is smaller than that of the second ratio.

19 Claims, 6 Drawing Sheets

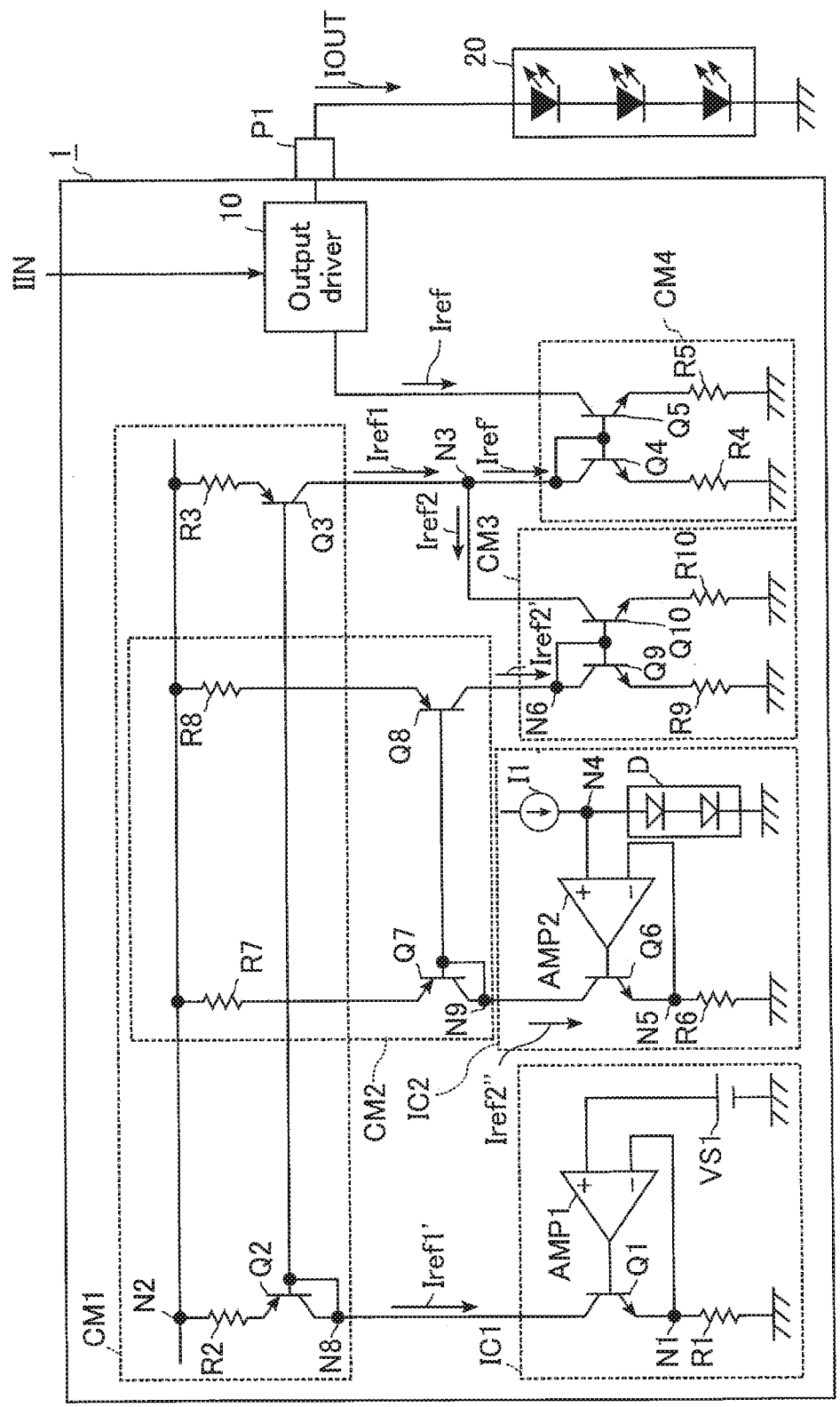
F I G. 1

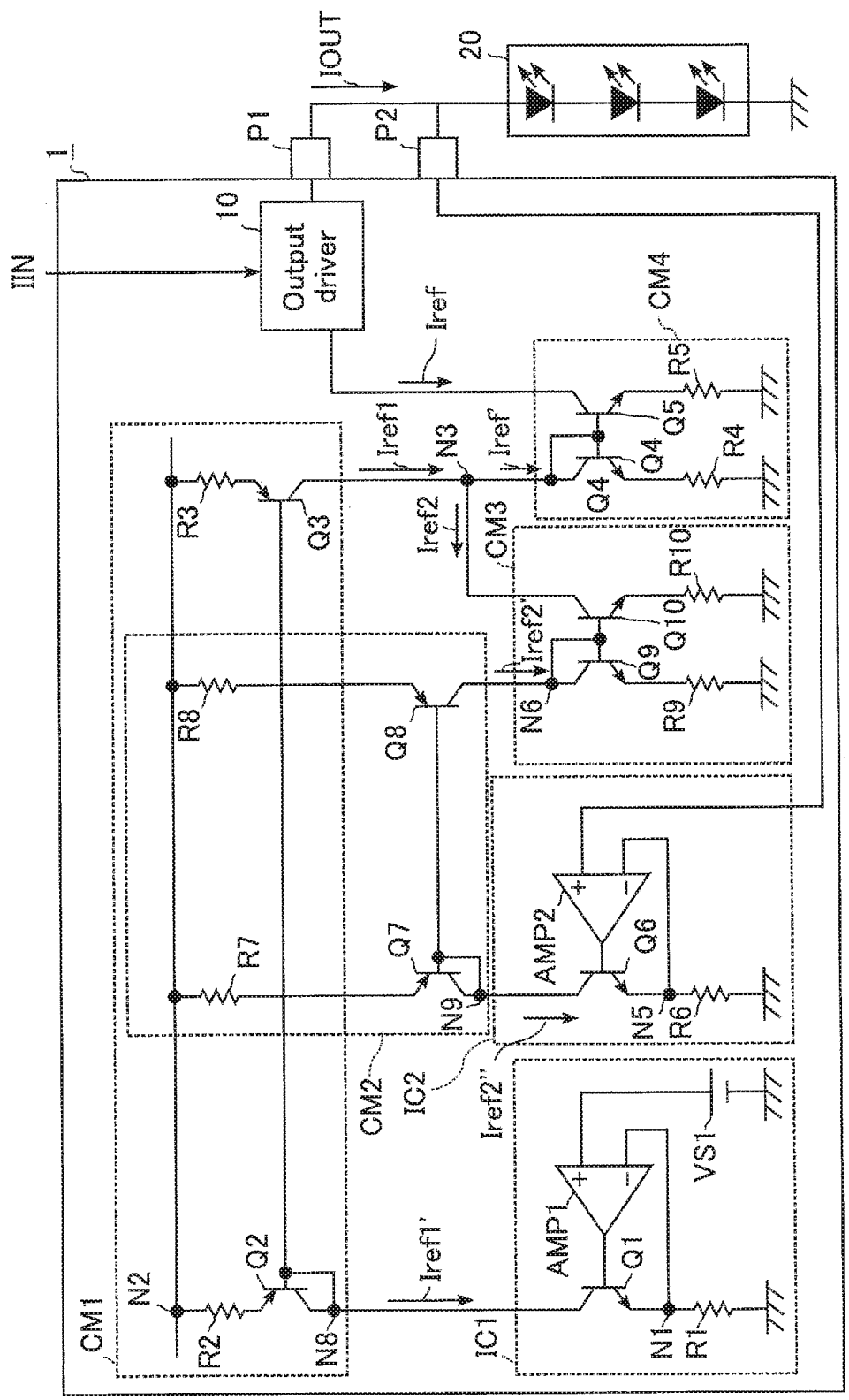
F I G. 4

SEMICONDUCTOR DEVICE

CROSS-REFERENCE TO RELATED APPLICATIONS

This application is based upon and claims the benefit of priority from Japanese Patent Application No. 2020-013363, filed Jan. 30, 2020, the entire contents of which are incorporated herein by reference.

FIELD

Embodiments described herein relate generally to a semiconductor device.

BACKGROUND

Semiconductor devices for stably supplying power to loads are known.

BRIEF DESCRIPTION OF THE DRAWINGS

FIG. 1 is a circuit diagram for explaining a configuration of a semiconductor device according to a first embodiment.

FIG. 4 is a circuit diagram for explaining a configuration of a semiconductor device according to a second embodiment.

DETAILED DESCRIPTION

Figure 2:
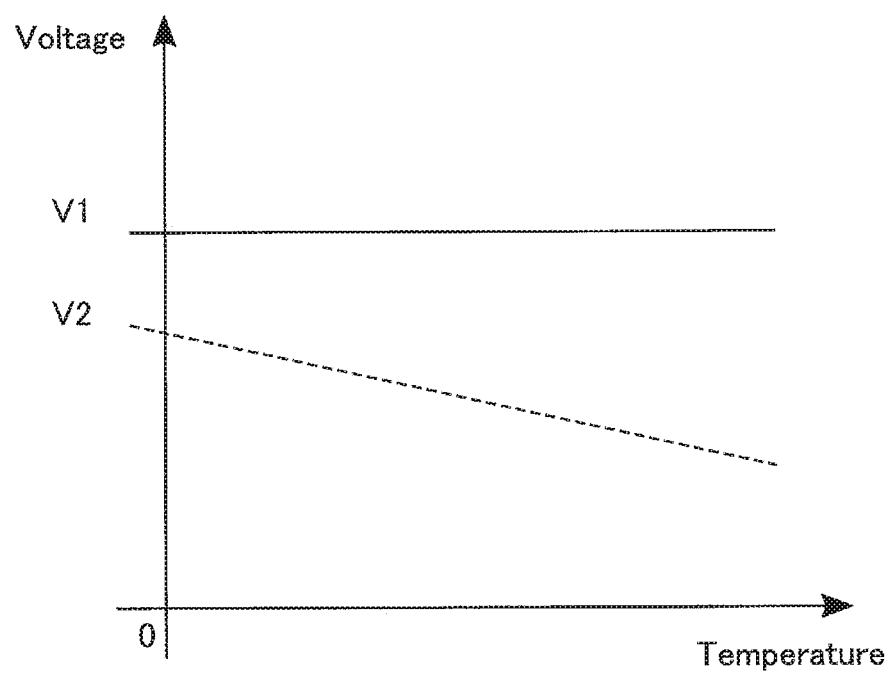
FIG. 2 is a diagram for explaining temperature characteristics of voltages in the semiconductor device according to the first embodiment.

In general, according to one embodiment, a semiconductor device includes a first current source, a first current mirror having an input end coupled to the first current source and an output end coupled to a first node, a second current source, a second current mirror having an input end coupled to the second current source and an output end coupled to a second node, a third current mirror having an input end coupled to the second node and an output end coupled to the first node, a fourth current mirror having an input end coupled to the first node, and an output driver configured to generate a current based on a current that flows to the output end of the fourth current mirror. A current that flows to the first current source changes at a first ratio with respect to temperature, a current that flows to the second current source changes at a second ratio having a negative correlation with respect to temperature, and an absolute value of the first ratio is smaller than an absolute value of the second ratio.

The embodiments of the present invention will be explained with reference to the drawings. In the following explanation, components having the same functions and configurations will be referred to by the same reference symbol. If structural components having the same reference symbols need to be distinguished from each other, letters or numerals may be added to the symbols. If the structural components do not particularly need to be distinguished from each other, only the common symbols will be used, without any letters or numerals attached.

1. First Embodiment

A semiconductor device according to a first embodiment will be explained.

The semiconductor device according to the first embodiment may be an integrated circuit (IC), serving as a driver for supplying a current to drive loads such as externally attached diodes.

1.1 Configuration

The configuration of the semiconductor device according to the first embodiment will be explained.

FIG. 1 is a circuit diagram for explaining the configuration of the semiconductor device according to the first embodiment.

A semiconductor device 1 is configured to supply a current IOUT to an externally driven light emitting diode (LED) 20. For instance, the semiconductor device 1 and externally driven LED 20 may correspond to part of an automobile system. The current IOUT is a current for driving the externally driven LED 20.

The externally driven LED 20 may include a plurality of LEDs that are serially coupled to each other, and may be coupled between the semiconductor device 1 and a ground in the forward direction. The externally driven LED 20 is driven by the current IOUT supplied from the semiconductor device 1. In the example of FIG. 1, the externally driven LED 20 is illustrated as including three LEDs. The number of LEDs, however, is not particularly limited. Only one or two LEDs may be included, or four or more LEDs may be included.

The semiconductor device 1 includes an output driver 10 and a terminal P1.

The terminal P1 is coupled to an input end (anode) of the externally driven LED 20, and the current IOUT of the output driver 10 is output to the terminal P1.

The output driver 10 has a first end to which a signal IIN is supplied, a second end from which a current Iref is output, and a third end coupled to the terminal P1 to output the current IOUT. Upon receipt of the signal IIN, the output driver 10 outputs the current IOUT, which is based on the current Iref output from the second end, through the third end to the terminal P1. The output driver 10 may include an amplification circuit. The amplification circuit is configured to output to the terminal P1 a current IOUT that is larger than the current Iref, based on the current Iref.

The semiconductor device 1 includes a first current source IC1, a second current source IC2, a first current mirror CM1, a second current mirror CM2, a third current mirror CM3, and a fourth current mirror CM4.

First, the configuration of the first current source IC1 will be explained.

The first current source IC1 includes a constant voltage source VS1, an operational amplifier AMP1, a switch element Q1 and a resistor R1.

The constant voltage source VS1 is configured to output a voltage V1 and includes a first end grounded and a second end coupled to the operational amplifier AMP1. The constant voltage source VS1 may adopt a band gap reference (BGR). The constant voltage source VS1 is a voltage source that is affected very little by temperature change, with a ratio of a change of the voltage V1 to temperature change being significantly smaller than a ratio of a change of a forward voltage V2 of a diode D, which will be described later, to temperature change.

The resistor R1 exhibits a resistance r1. The resistor R1 may be a polysilicon resistor or the like, and exhibits a negligibly small ratio of change in resistance to change in temperature.

The switch element Q1 is an NPN bipolar transistor. A collector of the switch element Q1 is coupled to a node NS, while an emitter of the switch element Q1 is coupled to a node N1. A base of the switch element Q1 is coupled to the operational amplifier AMP1.

The operational amplifier AMP1 includes a non-inversion input terminal (+), an inversion input terminal (−), and an output terminal. The non-inversion input terminal (+) is coupled to the second end of the constant voltage source VS1, and the voltage V1 is input to this terminal. The inversion input terminal (−) is coupled to the node N1, and is grounded via the resistor R1. The output terminal is coupled to the base of the switch element Q1.

Next, the configuration of the first current mirror CM1 will be explained.

The first current mirror CM1 includes switch elements Q2 and Q3, and resistors R2 and R3.

The switch element Q2 is a PNP bipolar transistor. A collector of the switch element Q2 is, together with a base of the switch element Q2, coupled to the node N8. An emitter of the switch element Q2 is coupled to a node N2 via the resistor R2.

The switch element Q3 is a PNP bipolar transistor. A base of the switch element Q3 is coupled to the node N8. As a result, a voltage between the base of the switch element Q2 and a collector of the switch element Q2 becomes equal to a voltage at the base of the switch element Q3. A collector of the switch element Q3 is coupled to a node N3. An emitter of the switch element Q3 is coupled to the node N2 via the resistor R3.

The resistors R2 and R3 may be polysilicon resistors or the like. The resistors R2 and R3 are designed in a manner such that the current flowing from an input end of the first current mirror CM1 is equivalent to the current flowing from an output end of the first current mirror CM1, regardless of temperature.

With the above configuration, the first current mirror CM1 outputs the current (output current) flowing to the switch element Q3, based on the current (reference current) flowing to the switch element Q2.

In the explanation below, among the first to fourth current mirrors CM1 to CM4, a collector of a switch element to which the reference current flows may be referred to as an "input end" of the current mirror, while a collector of a switch element to which the output current flows may be referred to as an "output end" of the current mirror.

Next, the configuration of the second current source IC2 will be explained.

The second current source IC2 includes the diode D, a constant current source I1, an operational amplifier AMP2, a switch element Q6, and a resistor R6.

The constant current source I1 outputs a current to a node N4. The diode D may include a plurality of diodes that are serially coupled to each other, and is coupled in the forward direction between the node N4 and a ground so as to be driven by the constant current source I1. The diode D exhibits negative temperature characteristics, with a forward voltage decreasing in accordance with increasing temperature. An electric potential of the node N4 therefore decreases in accordance with increasing temperature. In the example of FIG. 1, the diode D is illustrated as including two diodes.

The number of diodes, however, is not particularly limited. Only one diode may be included, or three or more diodes may be included.

The resistor R6 exhibits a resistance r6, and is coupled between a node N5 and a ground. Similarly to the resistor R1, the resistor R6 may be a polysilicon resistor or the like, and has a negligibly small ratio of the change of the resistance to temperature change. The current that flows to the resistor R6 is determined by the forward voltage of the diode D and the resistance r6, as described later, and therefore exhibits temperature characteristics similar to those of the forward voltage of the diode D.

The switch element Q6 is an NPN bipolar transistor. A collector of the switch element Q6 is coupled to a node N9. An emitter of the switch element Q6 is coupled to the node N5. A base of the switch element Q6 is coupled to the operational amplifier AMP2.

The operational amplifier AMP2 has a non-inversion input terminal (+), an inversion input terminal (−), and an output terminal. The non-inversion input terminal (+) is coupled to the node N4, and a voltage V2 of the node N4 is input to this terminal. The inversion input terminal (−) is coupled to the node N5, and grounded via the resistor R6. The output terminal is coupled to the base of the switch element Q6.

Next, the configuration of the second current mirror CM2 will be explained.

The second current mirror CM2 includes switch elements Q7 and Q8, and resistors R7 and R8.

The resistors R7 and R8 may be polysilicon resistors or the like. The resistors R7 and R8 are configured such that the current flowing from an input end of the second current mirror CM2 is equivalent to the current flowing from an output end of the second current mirror CM2, regardless of temperature.

The switch element Q7 is a PNP bipolar transistor. A collector of the switch element Q7 serves as the input end of the second current mirror CM2, and is coupled, together with a base of the switch element Q7, to the node N9. An emitter of the switch element Q7 is coupled to the node N2 via the resistor R7.

The switch element Q8 is a PNP bipolar transistor. A base of the switch element Q8 is coupled to the node N9. As a result, a voltage between the base of the switch element Q7 and the collector of the switch element Q7 becomes equal to a voltage at the base of the switch element Q8. A collector of the switch element Q8 serves as the output end of the second current mirror CM2, and is coupled to a node N6. An emitter of the switch element Q8 is coupled to the node N2 via the resistor R8.

With the above configuration, the second current mirror CM2 generates a current flowing to the switch element Q8, based on the current flowing to the switch element Q7.

The configuration of the third current mirror CM3 will now be explained.

The third current mirror CM3 includes switch elements Q9 and Q10, and resistors R9 and R10.

The resistors R9 and R10 may be polysilicon resistors or the like. The resistors R9 and R10 are designed such that the current flowing to an input end of the third current mirror CM3 is equivalent to the current flowing to an output end of the third current mirror CM3, regardless of temperature.

The switch element Q9 is an NPN bipolar transistor. A collector of the switch element Q9 serves as the input end of the third current mirror CM3, and is coupled to the node N6. An emitter of the switch element Q9 is grounded via the resistor R9.

The switch element Q10 is an NPN bipolar transistor. A collector of the switch element Q10 serves as the output end of the third current mirror CM3, and is coupled to the node N3. An emitter of the switch element Q10 is grounded via the resistor R10.

With the above configuration, the third current mirror CM3 generates a current flowing to the switch element Q10, based on the current flowing to the switch element Q9. Furthermore, the input end of the third current mirror CM3 is coupled to the output end of the second current mirror CM2 via the node N6. The output end of the third current mirror CM3 is coupled to the output end of the first current mirror CM1 via the node N3.

The configuration of the fourth current mirror CM4 will be explained.

The fourth current mirror CM4 includes switch elements Q4 and Q5, and resistors R4 and R5.

The resistors R4 and R5 may be polysilicon resistors or the like. The resistors R4 and R5 are designed such that the current flowing to an input end of the fourth current mirror CM4 is equivalent to the current flowing to an output end of the fourth current mirror CM4, regardless of temperature.

The switch element Q4 is an NPN bipolar transistor. A collector of the switch element Q4 serves as the input end of the fourth current mirror CM4, and is coupled, together with a base of the switch element Q4, to the node N3. An emitter of the switch element Q4 is grounded via the resistor R4.

The switch element Q5 is an NPN bipolar transistor. A base of the switch element Q5 is coupled to the node N3. A collector of the switch element Q5 serves as the output end of the fourth current mirror CM4, and is coupled to the second end of the output driver 10. An emitter of the switch element Q5 is grounded via the resistor R5.

With the above configuration, the fourth current mirror CM4 generates a current flowing to the switch element Q5, based on the current flowing to the switch element Q4. Furthermore, the input end of the fourth current mirror CM4 is coupled to both the output end of the first current mirror CM1 and the output end of the third current mirror CM3, via the node N3.

1.2 Operations

Next, the operation of the semiconductor device according to the first embodiment will be explained.

With the operation of its operational amplifier AMP1, the first current source IC1 operates in a manner such that an electric potential of the inversion input terminal (−) is equal to an electric potential of the non-inversion input terminal (+). An electric potential of the inversion input terminal (−) therefore becomes equal to the voltage V1 input to the non-inversion input terminal (+) of the operational amplifier AMP1. As a result, an electric potential of the node N1 coupled to the inversion input terminal (−) is equal to the voltage V1.

When an ON voltage is supplied from an output end of the operational amplifier AMP1 to the base of the switch element Q1, the switch element Q1 is turned to the ON state, and a current Iref1' as expressed by the following equation (1) thereby flows from the collector of the switch element Q1 to the emitter of the switch element Q1.

$$Iref1'=V1/r1 \tag{1}$$

The collector of the switch element Q1 is coupled to the input end of the first current mirror CM1 via the node N8.

In this manner, the current Iref1' flows into the switch element Q2 of the first current mirror CM1, and a current Iref1 having approximately the same current value as the current Iref1' flows into the switch element Q3 of the first current mirror CM1. The current Iref1, however, is changeable to any desired level with respect to the current Iref1' by varying the resistances of the resistors R2 and R3.

With the operation of its operational amplifier AMP2, the second current source IC2 operates in a manner such that an electric potential of the inversion input terminal (−) is equal to an electric potential of the non-inversion input terminal (+). The electric potential of the inversion input terminal (−) therefore becomes equal to the voltage V2 of the node N4 input to the non-inversion input terminal (+) of the operational amplifier AMP2. As a result, an electric potential the node N5 coupled to the inversion input terminal (−) is equal to the voltage V2.

When an ON voltage is supplied from an output end of the operational amplifier AMP2 to the base of the switch element Q6, the switch element Q6 is turned to the ON state, and thereby a current Iref2" as expressed by the following equation (2) flows from the collector of the switch element Q6 to the emitter of the switch element Q6.

$$Iref2''=V2/r6 \tag{2}$$

The collector of the switch element Q6 is coupled to the input end of the second current mirror CM2 via the node N9. In this manner, the current Iref2" flows into the switch element Q7 of the second current mirror CM2, and a current Iref2' having approximately the same current value as the current Iref2" flows into the switch element Q8 of the second current mirror CM2. The current Iref2', however, is changeable to any desired level with respect to the current Iref2" by varying the resistances of the resistors R7 and R8.

With the collector of the switch element Q9 coupled to the collector of the switch element Q8, the third current mirror CM3 causes a current Iref2 having approximately the same current value as the current Iref2' flowing into the node N6 to flow into the switch element Q10. As a result, the current Iref2 flows from the node N3 to the switch element Q10. The current Iref2, however, is changeable to any desired level with respect to the current Iref2' by adjusting the resistances of the resistors R9 and R10.

As described above, the output end of the second current mirror CM2, the output end of the third current mirror CM3, and the input end of the fourth current mirror CM4 are commonly coupled to the node N3. As a result, a current Iref' flowing from the node N3 to the switch element Q4 is a difference current as expressed by the following equation (3), which can be obtained by subtracting the current Iref2 from the current Iref1.

$$Iref'=Iref1-Iref2 \tag{3}$$

The fourth current mirror CM4 causes the current Iref having approximately the same level as the current Iref' flowing from the node N3 to the switch element Q4 to flow to the switch element Q5. As a result, the current Iref flows from the output driver 10 to the switch element Q10. The current Iref, however, is changeable to any desired level with respect to the current Iref' by varying the resistances of the resistors R4 and R5.

With the operation of the amplification circuit of the output driver 10 and the like, the output driver 10 outputs a current IOUT that is larger than the current Iref to the terminal P1, based on the current Iref. The current IOUT output to the terminal P1 drives the externally driven LED 20.

1.3 Temperature Characteristics

Next, temperature characteristics of the currents Iref1, Iref2 and Iref will be explained.

Figure 3:
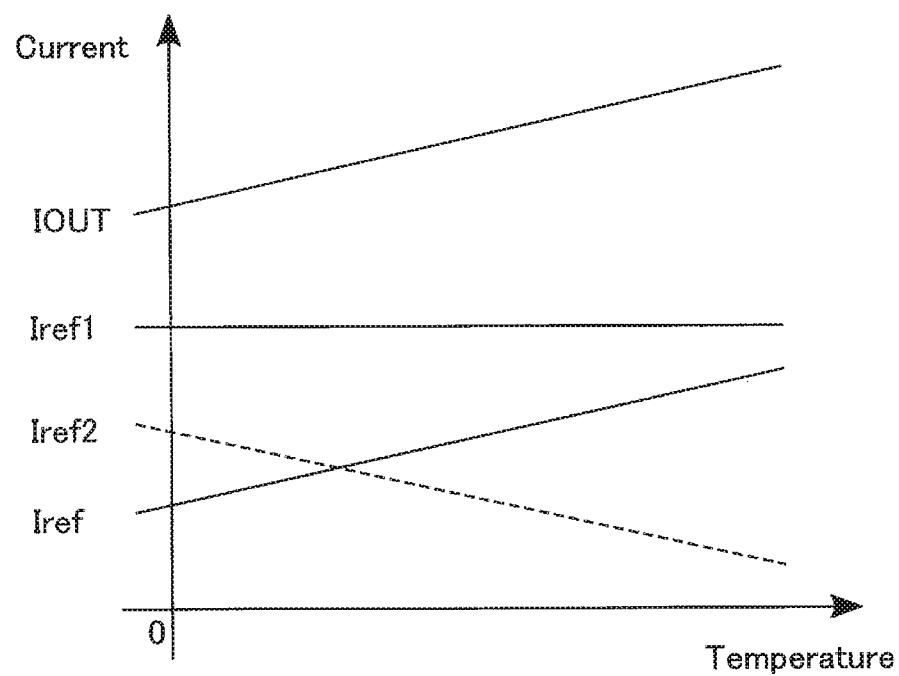
FIG. 3 is a diagram for explaining temperature characteristics of currents in the semiconductor device according to the first embodiment.

FIG. 2 is a diagram for explaining temperature characteristics of voltages in the semiconductor device according to the first embodiment. FIG. 3 is a diagram far explaining temperature characteristics of currents in the semiconductor device according to the first embodiment.

As discussed above, the current Iref1 is determined based on the voltage V1 and resistance r1 in the same manner as expressed by equation (1), and changes at a first ratio with respect to temperature. The current Iref' is determined based on the voltage V2 and resistance r2 in the same manner as expressed by equation (2), and changes at a second ratio with respect to temperature.

The voltage V2 is the electric potential of the node N4, which receives a current from the constant current source I1 and is grounded via the diode D. This means that the voltage V2 is the forward voltage of the diode D. If the diode D contains two serially coupled diodes, the voltage V2 can be expressed by the following equation (4), using the forward voltages Vf of these two diodes.

$$V2 = 2 \times Vf \quad (4)$$

When the current flowing into the diodes is maintained constant regardless of temperature, the forward voltages of the diodes exhibit negative temperature characteristics, which means that the forward voltages of the diodes decrease as temperature rises. As indicated in FIG. 2, the voltage V2 of the node N4 decreases as temperature rises, exhibiting negative temperature characteristics.

On the other hand, the voltage source VS1 is configured such that the absolute value of a ratio of its voltage change to temperature change is negligibly small with respect to that of the diode D. Thus, as indicated in FIG. 2, a ratio of the voltage change of the voltage V1 to temperature change is negligibly smaller than that of the voltage V2.

As described above, the current Iref1' is determined based on the voltage V1 and resistance r1, and the current Iref2" is determined based on the voltage V2 and resistance r6. Here, the resistances r1 and r6 change very little in accordance with temperature change. The currents Iref1' and Iref2" therefore exhibit temperature characteristics similar to the temperature characteristics of the voltages V1 and V2, respectively. In other words, the current Iref1' changes very little under temperature change, while the current Iref2" exhibits negative temperature characteristics. Thus, as indicated in FIG. 3, the current Iref2 exhibits negative temperature characteristics, decreasing as temperature rises. On the other hand, the current Iref1 changes negligibly, little with respect to the current Iref2 even when temperature rises.

The current Iref is a difference current obtained by subtracting the current Iref2 having negative temperature characteristics from the current Iref1, which changes very little with respect to temperature change. Due to this, the current Iref demonstrates positive temperature characteristics, as indicated in FIG. 3. As a result, the current IOUT also demonstrates positive temperature characteristics in the same manner as the current Iref, increasing as temperature rises.

1.4 Effects of First Embodiment

In the semiconductor device 1 designed to drive the externally driven LED 20, when a temperature of the externally driven LED 20 is higher than room temperature (e.g., 25 degrees Celsius), the current to be output to the externally driven LED 20 should be increased to greater than room temperature in order to maintain the externally driven LED 20 at a constant brightness. In other words, when the temperature of the externally driven LED 20 is higher than room temperature, the brightness of the externally driven LED 20 can be prevented from decreasing by increasing the current for driving the externally driven LED 20. For this reason, the current IOUT of the semiconductor device 1 to be supplied to the externally driven LED 20 should be increased in accordance with the increase in the temperature of the externally driven LED 20 and the semiconductor device 1.

According to the first embodiment, the first current mirror CM1 includes the input end coupled to the first current source IC1, which can be regarded as a constant current source. The second current mirror CM2 includes the input end coupled to the second current source IC2 that outputs a current having negative temperature characteristics, and the output end coupled to the input end of the third current mirror CM3. The fourth current mirror CM4 includes the input end commonly coupled to the output end of the first current mirror CM1 and the output end of the third current mirror CM3, and the output end coupled to the output driver. With this configuration, the current Iref, and also the current IOUT for driving the externally driven LED 20, exhibit positive temperature characteristics, increasing as temperature rise. In an automobile system, the semiconductor device 1 may be arranged adjacent to the externally driven LED 20 so that a temperature of the diode D inside the semiconductor device 1 may change in the same manner as the temperature of the externally driven LED 20. The current Iref therefore may vary in accordance with temperature change of the semiconductor device 1 and the externally driven LED 20. Thus, when a temperature of the semiconductor device 1 and the externally driven LED 20 is higher than room temperature, the current to be supplied to the externally driven LED 20 can be increased in comparison to the environment of room temperature. In this manner, the brightness of the externally driven LED 20, which tends to be lowered due to the increased temperature of the semiconductor device 1 and the externally driven LED 20, can be prevented from being lowered.

2. Second Embodiment

Next, a semiconductor device according to a second embodiment will be explained. The second embodiment differs from the first embodiment in that the second current source IC2 determines the voltage to be output to the non-inversion input terminal (+) of the operational amplifier AMP2, using a decreased voltage of the externally driven LED 20, instead of a decreased voltage of the diode D inside the semiconductor device 1. Configurations and operations the same as those of the first embodiment will be omitted from the explanation, and the configurations and operations different from the first embodiment will be focused on.

2.1 Configuration

FIG. 4 is a circuit diagram for explaining the configuration of the semiconductor device according to the second embodiment, which corresponds to FIG. 1 of the first embodiment.

As illustrated in FIG. 4, the semiconductor device 1 includes a terminal P2 coupled to the externally driven LED 20, in place of the diode D and the constant current source I1 in FIG. 1. The terminal P2 includes a first end coupled to the input end (anode) of the externally driven LED 20 and a second end coupled to the non-inversion input terminal (+) of the operational amplifier AMP2. With such a configuration, the terminal P2 outputs the voltage V2 of the terminal P2 determined by the externally driven LED 20 to the non-inversion input terminal (+).

2.2 Operations and Temperature Characteristics

The operations other than that of the second current source IC2 are the same as the operations of the first embodiment, and thus the explanation of the same operations is omitted.

In the second current source IC2, the operational amplifier ANP2 operates to bring the electric potential of the inversion input terminal (−) to the same level as the voltage V2 of the terminal P2, which is input to the non-inversion input terminal (+) of the operational amplifier AMP2. As a result, the electric potential of the node N5 coupled to the inversion input terminal (−) is equal to the voltage V2. Thus, in the same manner as in the first embodiment, the current Iref2" expressed by equation (2) is output to the collector of the switch element Q6.

In the externally driven LED 20, in which a plurality of LEDs are coupled to each other in the current flowing direction, the voltage V2 of the terminal P2 equals the electric potential obtained by adding up the forward voltages of the LEDs in the externally driven LED 20. The forward voltages of the LEDs are lowered as temperature rises due to the temperature characteristics of the LEDs, in the same manner as the diode D of the first embodiment. The voltage V2 therefore exhibits negative temperature characteristics, decreasing as the temperature of the externally driven LED 20 increase. Accordingly, the current Iref2" also exhibits negative temperature characteristics, decreasing as temperature increases.

As described earlier, the current Iref2 that flows from the node N3 to the collector of the switch element Q10 has temperature characteristics similar to those of the current Iref2". The current Iref2 therefore decreases as temperature rises. Accordingly, the current Iref also exhibits positive temperature characteristics, increasing as temperature rises, in the same manner as in the first embodiment.

2.3 Effects of Second Embodiment

According to the second embodiment, the terminal P2 is coupled between the non-inversion input terminal (+) of the operational amplifier AMP2 and the input end (anode) of the externally driven LED 20. As such, the current value of the current Iref2 can be determined using the temperature characteristics of the externally driven LED 20 in place of the temperature characteristics of the diode D provided in the semiconductor device 1, and the effects similar to the first embodiment can be thereby attained.

3. Modification

The first and second embodiments have been discussed, but are not limitations. Various forms of modification can be suitably adopted.

For instance, in the first and second embodiments, the value of the current IOUT increases as temperature rises, but the embodiments are not limited thereto. In particular, when temperature is equal to or exceeds a predetermined value, the configuration may be configured such that the current IOUT decreases.

3.1 Configuration

Figure 5:
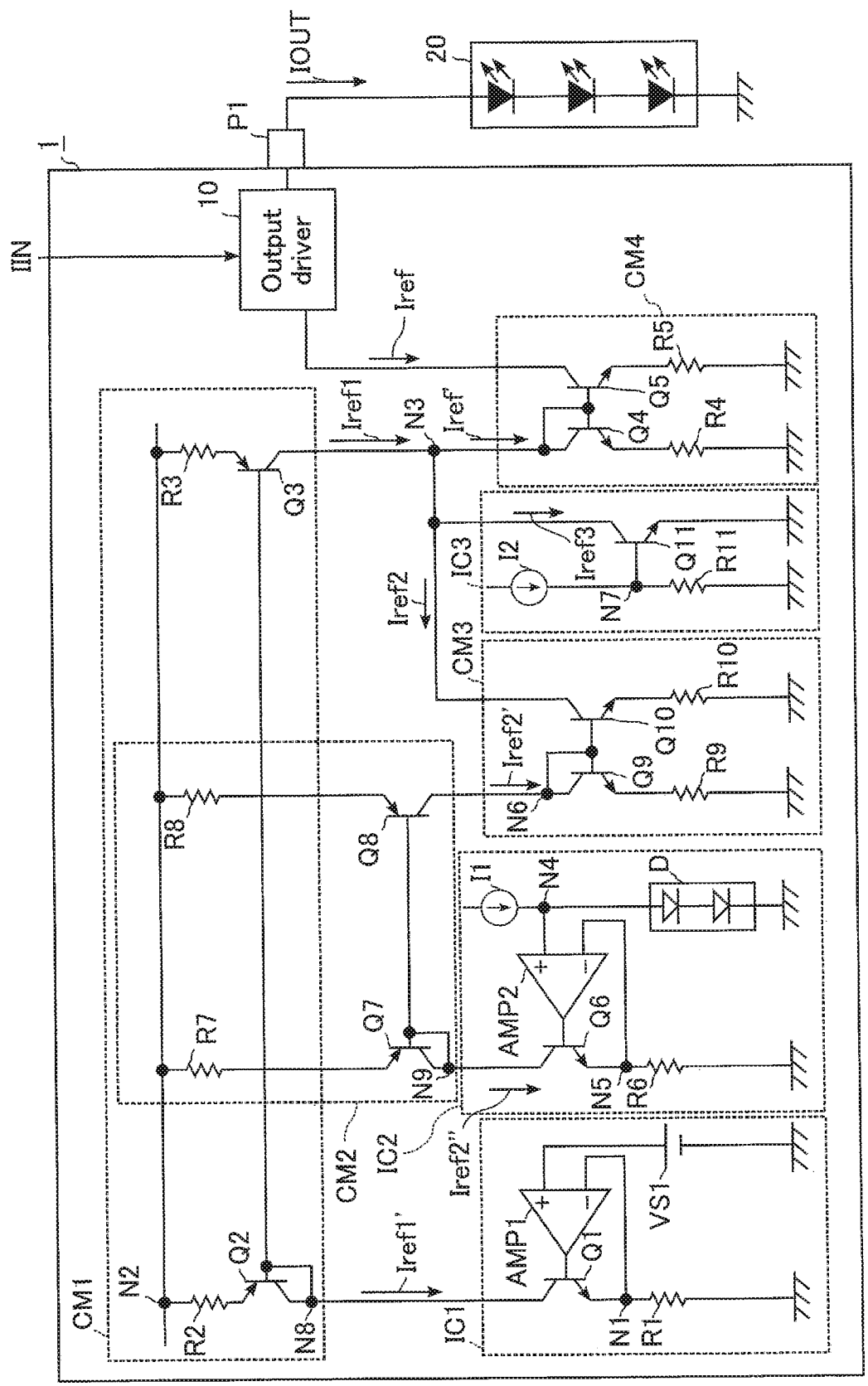
FIG. 5 is a circuit diagram for explaining a configuration of a semiconductor device according to a modification.

FIG. 5 is a circuit diagram for explaining the configuration of a semiconductor device according to a modification, which corresponds to FIG. 1 of the first embodiment.

As illustrated in FIG. 5, the semiconductor device 1 differs from the first embodiment in an additionally incorporated third current circuit IC3. Configurations and operations the same as those of the first embodiment will be omitted from the explanation, and the configurations and operations different from the first embodiment will be focused on.

The third current circuit IC3 includes a switch element Q11, a resistor R11, and a constant current source I2.

The switch element Q11 is an NPN bipolar transistor. A collector of the switch element Q11 is an input end of the third current circuit IC3, and is coupled to the node N3. An emitter of the switch element Q11 is grounded. A base of the switch element Q11 is coupled to a node N7 arranged between the constant current source I2 and the resistor R11.

The constant current source I2 supplies a current to the node N7.

The resistor R11 may be a polysilicon resistor or the like.

The constant current source I2 and the resistor R11 are configured such that a ratio of a change of a voltage VN7 of the node N7 with respect to temperature change is negligibly smaller than a ratio of a change of an ON voltage of the switch element Q11 with respect to temperature change. For instance, a ratio of a change of the current output by the constant current source I2 to temperature change, and that of the resistance of the resistor R11 are reduced so that the ratio of the voltage VN7 of the node N7 to temperature change can be sufficiently reduced.

3.2 Operations and Temperature Characteristics

The operations other than that of the third current circuit IC3 are the same as the operations of the first embodiment, and thus the explanation of the same operations is omitted.

Figure 6:
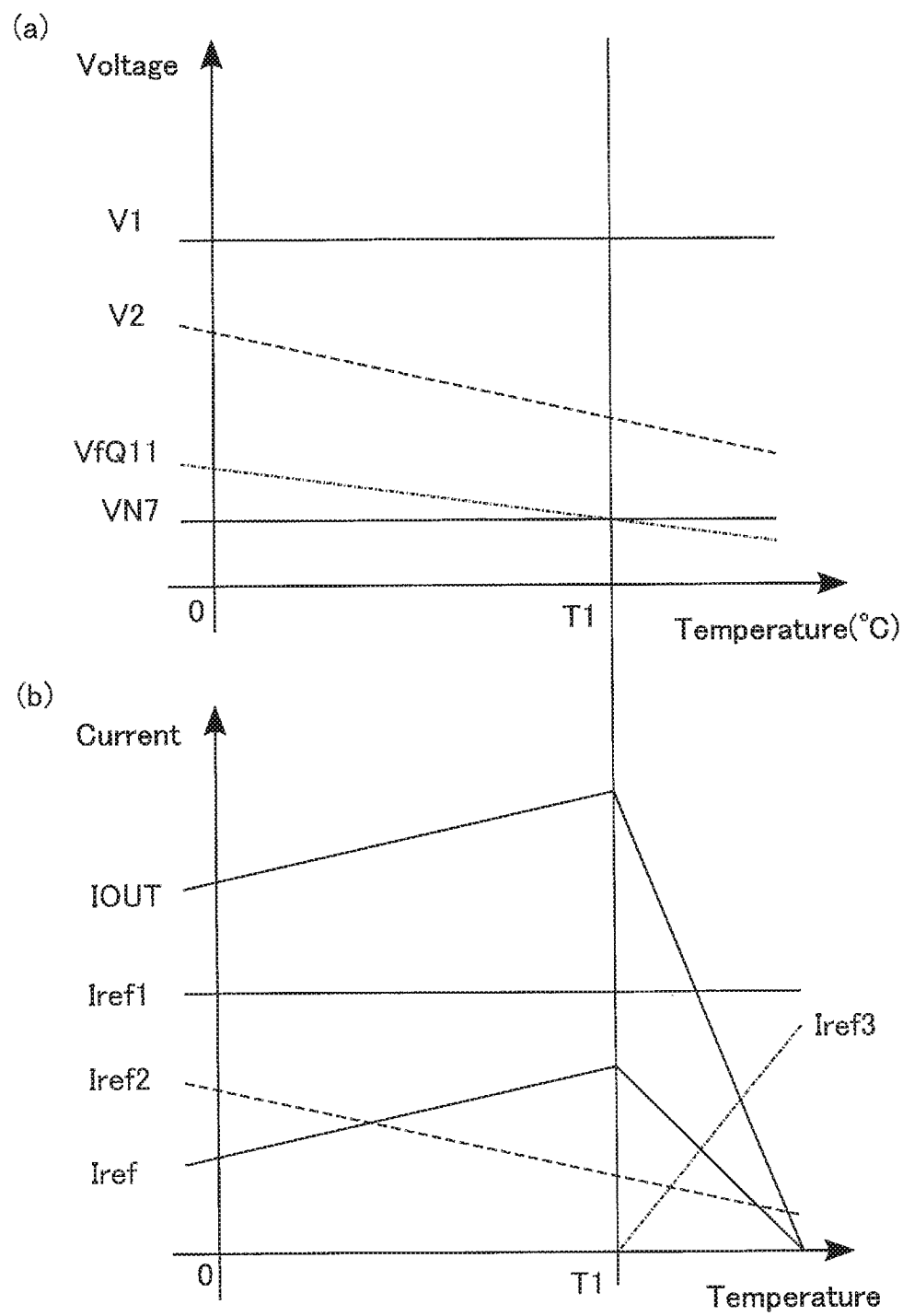
FIG. 6 is a diagram for explaining temperature characteristics of voltages and currents in the semiconductor device according to the modification.

FIG. 6 is a diagram for explaining temperature characteristics of voltages and currents in the semiconductor device according to the modification.

A threshold voltage VfQ11 of the switch element Q11, which exhibits negative temperature characteristics, decreases as temperature rises, as indicated in (a) of FIG. 6.

The node N7 receives a current from the constant current source I2, and is grounded via the resistor R11. The voltage of the node N7 is therefore determined by the constant current source I2 and the resistance of the resistor R11.

As discussed above, the constant current source I2 and the resistor R11 are designed such that the ratio of the change of the voltage VN7 with respect to temperature change is significantly smaller than the ratio of the threshold voltage VfQ11 with respect to temperature change. In particular, the resistor R11 is designed such that its resistance exhibits a change as small as the resistances r1 and r6 in accordance with temperature change. Furthermore, the constant current source I2 is designed such that the current supplied exhibits a change as small as the constant current source I1 in accordance with temperature change.

The above constant current source I2 and resistor R11 may be designed to satisfy VfQ11>VN7 when temperature is lower than a predetermined temperature T1, and VfQ11≤VN7 when temperature is higher than or equal to the predetermined temperature T1. As a result, the switch element Q11 is turned to the OFF state when temperature is lower than the temperature T1, and to the ON state when temperature is higher than or equal to the temperature T1.

When the temperature of the semiconductor device 1 is lower than the temperature T1, as indicated in (b) of FIG. 6, a current Iref3 does not flow between the node N3 and the collector of the switch element Q11. The semiconductor device 1 therefore performs substantially the same operation as in the first embodiment. Thus, the current Iref exhibits positive temperature characteristics when temperature is lower than the temperature T1 in the same manner as in the first embodiment, and the current value increases as temperature rises.

When the temperature of the semiconductor device 1 is higher than or equal to the temperature T1, the current Iref3 flows between the node N3 and the collector of the switch element Q11. The current Iref1 flows from the collector of the switch element Q3 to the node N3. The current Iref2 flows from the node N3 to the collector of the switch element Q10. The current Iref' flows from the node N3 to the collector of the switch element Q4. This means that the current Iref' is a difference current obtained by subtracting the sum of the current Iref2 and current Iref3 from the current Iref1. The current Iref therefore can be expressed by the following equation (5) using the current Iref1, current Iref2 and current Iref3.

$$Iref=Iref1-(Iref2+Iref3) \quad (5)$$

A temperature characteristics of the current Iref3 will be explained.

As discussed earlier, the switch element Q11 is turned to the ON state when temperature is higher than or equal to the temperature T1. For this reason, when temperature is higher than or equal to the temperature T1, the current Iref3 exhibits positive temperature characteristics, changing at a third ratio, as indicated in (b) of FIG. 6.

The third current circuit IC3 is configured such that the absolute value of the third ratio is greater than the absolute value of the second ratio. With such a configuration, the sum of the current Iref2 and the current Iref3 exhibits positive temperature characteristics. As a result, the current Iref exhibits negative temperature characteristics when temperature is higher than or equal to the temperature T1, and the value of the current Iref decreases as temperature rises, as indicated in (b) of FIG. 6.

3.3 Effects of Modification

According to the modification, the collector of the switch element Q11 is coupled to the node N3. With this coupling, the current Iref3 flows between the node N3 and switch element Q11 when the temperature of the semiconductor device 1 is higher than or equal to the temperature T1. As a result, the current Iref' exhibits positive temperature characteristics below the temperature T1, and negative temperature characteristics at or above the temperature T1. In the same manner, the current Iref and current IOUT generated based on the current Iref' exhibit positive temperature characteristics below the temperature T1, and negative temperature characteristics at or above the temperature T1. Thus, the current IOUT can be swiftly reduced when temperature rises higher than or equal to the temperature T1 so that a breakdown of the output driver 10 due to an excessively increased current IOUT can be prevented.

4. Other Embodiments

In the first and second embodiments and modification, the resistors R1 and R6 are arranged inside the semiconductor device 1, but the arrangement is not limited thereto. For instance, with additional terminals arranged in the semiconductor device 1, the resistors R1 and R6 may be provided outside the semiconductor device 1.

Figure 7:
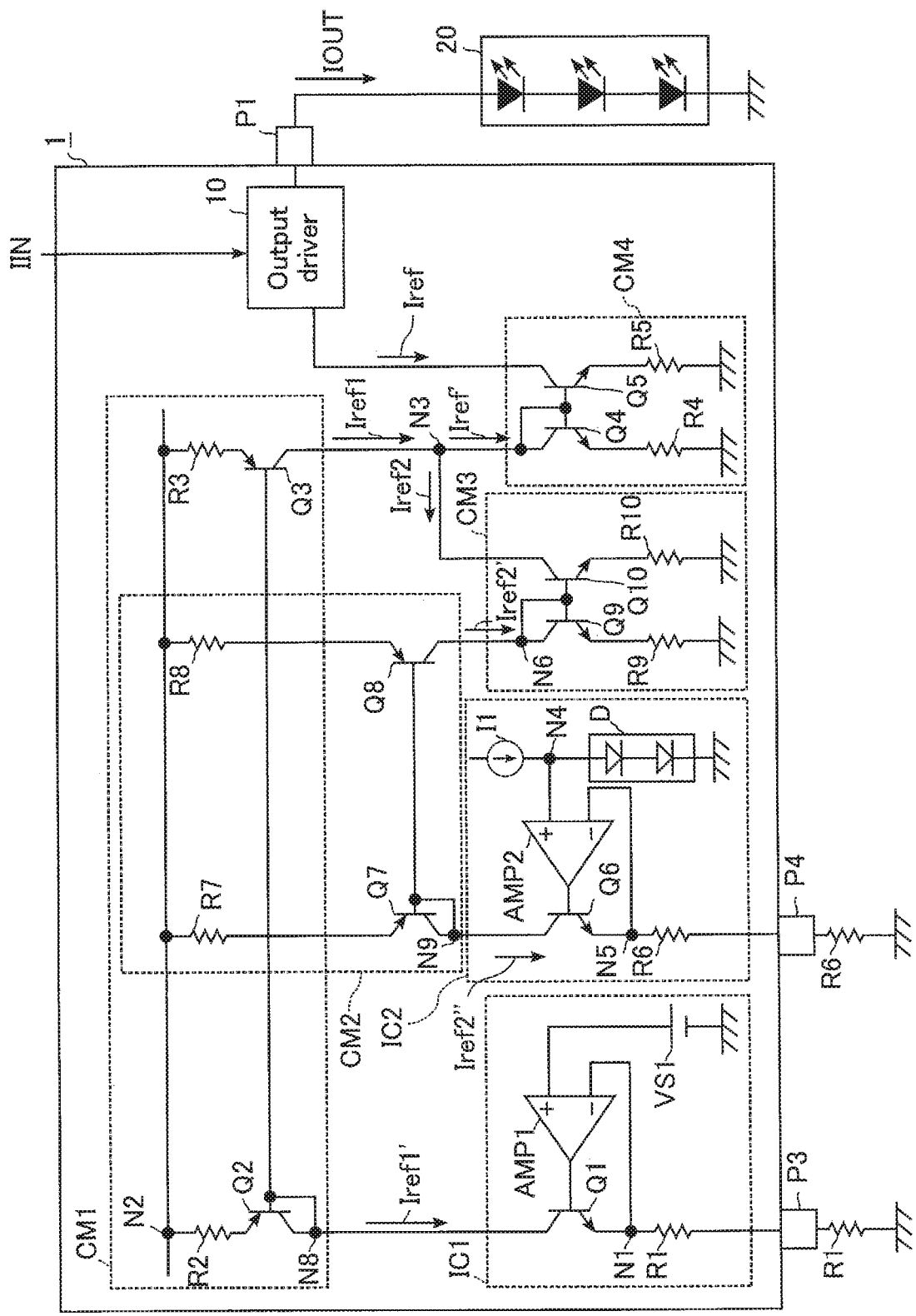
FIG. 7 is a circuit diagram for explaining a configuration of a semiconductor device according to another embodiment.

FIG. 7 is a circuit diagram for explaining the configuration of a semiconductor device 1 according to another embodiment, in which resistors R1 and R6 are provided outside the semiconductor device 1. FIG. 7 corresponds to FIG. 1 of the first embodiment.

As illustrated in FIG. 7, the semiconductor device 1 further includes terminals P3 and P4. The resistor R1 is coupled between the terminal P3 and the ground outside the semiconductor device 1. The resistor R6 is coupled between the terminal P4 and the ground outside the semiconductor device 1.

Such a configuration can produce effects similar to the first embodiment. In addition, by suitably designing the resistors R1 and R6 arranged outside the semiconductor device 1, the level and temperature characteristics of the current IOUT can be easily adjusted.

In the first and second embodiments and modification, the switch elements Q1, Q4 to Q6 and Q9 to Q11 are NPN bipolar transistors, and the switch elements Q2, Q3, Q7 and Q8 are PNP bipolar transistors. The configuration, however, is not limited thereto. N-type metal-oxide-semiconductor (MOS) transistors may be adopted for the switch elements Q1, Q4 to Q6 and Q9 to Q11, and P-type MOS transistors may be adopted for the switch elements Q2, Q3, Q7 and Q8.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit.

What is claimed is:

1. A semiconductor device comprising:
a first current source;
a first current mirror having an input end coupled to the first current source and an output end coupled to a first node;
a second current source;
a second current mirror having an input end coupled to the second current source and an output end coupled to a second node;
a third current mirror having an input end coupled to the second node and an output end coupled to the first node;
a fourth current mirror having an input end coupled to the first node; and
an output driver configured to generate a current based on a current that flows to the output end of the fourth current mirror,
wherein a current that flows to the first current source changes at a first ratio with respect to temperature,
a current that flows to the second current source changes at a second ratio having a negative correlation with respect to the temperature, and
an absolute value of the first ratio is smaller than an absolute value of the second ratio.

2. The device of claim 1, wherein the first current source includes:
a first voltage source;
a first switch element having a first and coupled to a third node and a second end coupled to the input end of the first current mirror; and
a first operational amplifier having a first input end coupled to the first voltage source, a second input end coupled to the third node, and an output end coupled to a control end of the first switch element.

3. The device of claim 2, wherein
the first current source further includes a first resistor coupled to the third node.

4. The device of claim 1, wherein
the second current source includes:
a second voltage source;
a second switch element having a first end coupled to a fourth node and a second end coupled to the input end of the second current mirror;
a second operational amplifier having a first input end coupled to the second voltage source, a second input end coupled to the fourth node, and an output end coupled to a control end of the second switch element, and
the second voltage source is configured to output a voltage having a negative correlation with the temperature.

5. The device of claim 4, wherein
the second voltage source includes a third current source and a first element that are serially coupled to each other,
the first input end of the second operational amplifier is coupled between the third current source and the first element, and
the first element is configured to demonstrate a voltage drop amount having a negative correlation with the temperature.

6. The device of claim 5, wherein
the second current source further includes a second resistor coupled to the fourth node.

7. The device of claim 5, wherein
the second current source further includes a third terminal coupled to the fourth node, and
the third terminal is coupled to a second resistor arranged outside the semiconductor device.

8. The device of claim 4, further comprising:
a first terminal coupled to the output driver; and
a second terminal coupled to the first input end of the second operational amplifier,
wherein the first terminal and the second terminal are commonly coupled to a second element arranged outside the semiconductor device.

9. The device of claim 8, wherein
the second current source further includes a second resistor coupled to the fourth node.

10. The device of claim 8, wherein
the second current source further includes a third terminal coupled to the fourth node, and
the third terminal is coupled to a second resistor arranged outside the semiconductor device.

11. The device of claim 4, wherein
the second current source further includes a second resistor coupled to the fourth node.

12. The device of claim 4, wherein
the second current source further includes a third terminal coupled to the fourth node, and
the third terminal is coupled to a second resistor arranged outside the semiconductor device.

13. The device of claim 1, further comprising:
a fourth current source having an input end coupled to the first node,
wherein a current that flows to the input end of the fourth current source changes at a third ratio having a positive correlation with respect to the temperature, and
an absolute value of the third ratio is greater than the absolute value of the second ratio.

14. The device of claim 13, wherein
the fourth current source includes a third voltage source, and a third switch element having a first end coupled to the first node and a second end coupled to the third voltage source,
the third voltage source outputs a voltage that changes at a fourth ratio with respect to the temperature,
a threshold voltage of the third switch element changes at a fifth ratio having a negative correlation with respect to the temperature, and
an absolute value of the fourth ratio is smaller than an absolute value of the fifth ratio.

15. The device of claim 14, wherein
the third voltage source includes a fifth current source and a third resistor that are serially coupled to each other, and
the second end of the third switch element is coupled between the fifth current source and the third resistor.

16. The device of claim 1, wherein
the first current mirror includes a fourth switch element and a fifth switch element,
a first end of the fourth switch element, a control end of the fourth switch element, and a control end of the fifth switch element are commonly coupled to the first current source, and
a first end of the fifth switch element is coupled to the first node.

17. The device of claim 1, wherein
the second current mirror includes a sixth switch element and a seventh switch element,
a first end of the sixth switch element, a control end of the sixth switch element, and a control end of the seventh switch element are commonly coupled to the second current source, and
a first end of the seventh switch element is coupled to the second node.

18. The device of claim 1, wherein
the third current mirror includes an eighth switch element and a ninth switch element,
a first end of the eighth switch element, a control end of the eighth switch element, and a control end of the ninth switch element are commonly coupled to the second node, and
a first end of the ninth switch element is coupled to the first node.

19. The device of claim 1, wherein
the fourth current mirror includes a tenth switch element and an eleventh switch element,
a first end of the tenth switch element, a control end of the tenth switch element, and a control end of the eleventh switch element are commonly coupled to the first node, and
a first end of the eleventh switch element is coupled to the output driver.

* * * * *